US009713318B1

(12) United States Patent
Albawi et al.

(10) Patent No.: US 9,713,318 B1
(45) Date of Patent: Jul. 25, 2017

(54) AUTOMATIC BIRD CAGE

(71) Applicants: Anwar Albawi, Safat (KW); Latifah Alrashid, Safat (KW); Hessa Alotaibi, Safat (KW); Zainab Ali, Safat (KW)

(72) Inventors: Anwar Albawi, Safat (KW); Latifah Alrashid, Safat (KW); Hessa Alotaibi, Safat (KW); Zainab Ali, Safat (KW)

( * ) Notice: Subject to any disclaimer, the term of this patent is extended or adjusted under 35 U.S.C. 154(b) by 0 days.

(21) Appl. No.: 15/202,448

(22) Filed: Jul. 5, 2016

(51) Int. Cl.
*A01K 31/06* (2006.01)
*A01K 31/04* (2006.01)
*A01K 39/04* (2006.01)
*A01K 31/12* (2006.01)
*A01K 1/015* (2006.01)
*G08C 17/02* (2006.01)
*H04N 7/18* (2006.01)

(52) U.S. Cl.
CPC ............ *A01K 31/04* (2013.01); *A01K 1/0151* (2013.01); *A01K 31/06* (2013.01); *A01K 31/12* (2013.01); *A01K 39/04* (2013.01); *G08C 17/02* (2013.01); *H04N 7/183* (2013.01)

(58) Field of Classification Search
CPC .... A01K 1/0132; A01K 1/0151; A01K 31/06; A01K 31/12; A01K 31/04; A01K 39/04
USPC ....... 119/432, 459, 462, 464, 468, 471, 475, 119/476, 479, 52.1, 52.2, 53, 56.1, 57.1, 119/57.4, 57.8, 57.92
See application file for complete search history.

(56) References Cited

U.S. PATENT DOCUMENTS

| 4,235,196 A * | 11/1980 | Moliterni | A01K 31/04 119/464 |
| 4,422,409 A * | 12/1983 | Walker | A01K 5/0291 119/51.11 |
| 6,062,166 A * | 5/2000 | Macrina | A01K 7/02 119/51.11 |
| 6,701,866 B1 * | 3/2004 | Shieh | A01K 5/0291 119/51.11 |
| 7,152,550 B2 * | 12/2006 | Walker | A01K 5/0291 119/51.11 |
| 7,789,041 B1 | 9/2010 | Taylor | |
| 8,156,895 B2 * | 4/2012 | Caputa | A01K 1/011 119/166 |
| 2004/0194714 A1 * | 10/2004 | Lee | A01K 5/0114 119/54 |
| 2007/0295277 A1 * | 12/2007 | Kin | A01K 5/0275 119/51.02 |
| 2008/0017128 A1 * | 1/2008 | Willinger | A01K 31/06 119/464 |
| 2011/0139076 A1 * | 6/2011 | Pu | A01K 5/0114 119/51.02 |

(Continued)

OTHER PUBLICATIONS

Albawi, et al. Social media websites including Twitter and Instagram, https://www.instagram.com/p/217fehhUIJ/, dating back to Apr. 21, 2015.

(Continued)

*Primary Examiner* — Lisa Tsang
(74) *Attorney, Agent, or Firm* — Richard C. Litman

(57) ABSTRACT

The automatic bird cage is a bird housing provided with at least two containers that the user can control wirelessly via a mobile application, and the user will also control a wiper placed at the ground of the cage for cleaning. The system is also supported with a camera that displays the bird actions inside the cage, and to monitor the food level.

17 Claims, 13 Drawing Sheets

(56) References Cited

U.S. PATENT DOCUMENTS

2014/0182518 A1    7/2014  Boehm

OTHER PUBLICATIONS

Albawi, et al. Social media websites including Twitter and Instagram, https://twitter.com/ku_wcc, dating back to Apr. 21, 2015.

* cited by examiner

AUTOMATIC BIRD CAGE

BACKGROUND OF THE INVENTION

1. Field of the Invention

The present invention relates to bird feeders, and particularly to an automatic bird cage that feeds and houses a bird, the bird housing being self-cleaning.

2. Description of the Related Art

Bird owners are continually in search of ways of making their birds more comfortable and to better relate to their birds. Birds such as cockatiels are often highly domesticated and in many cases are left in a home or bird sanctuary for extended periods of time. These periods of absence from the bird's human "family" can cause anxiety and can cause a bird to become discontented and even destructive. Birds sometimes may also refuse to eat when left for long periods of time. Such circumstances are not conducive for the Birds overall health and well being. Accordingly, there exists the need for a bird feeding and watering device which will, by recording the master's voice or other sound, both calm the bird allaying anxiety and encouraging the bird to eat and drink. Thus, an automatic bird cage solving the aforementioned problems is desired.

SUMMARY OF THE INVENTION

The automatic bird cage includes a bird housing provided with two (2) containers that the user can control wirelessly via a mobile application, and permits the user to also control a wiper placed at the ground of the cage for cleaning. The system is also supported with a camera that displays the bird actions inside the cage, and to monitor the food level.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
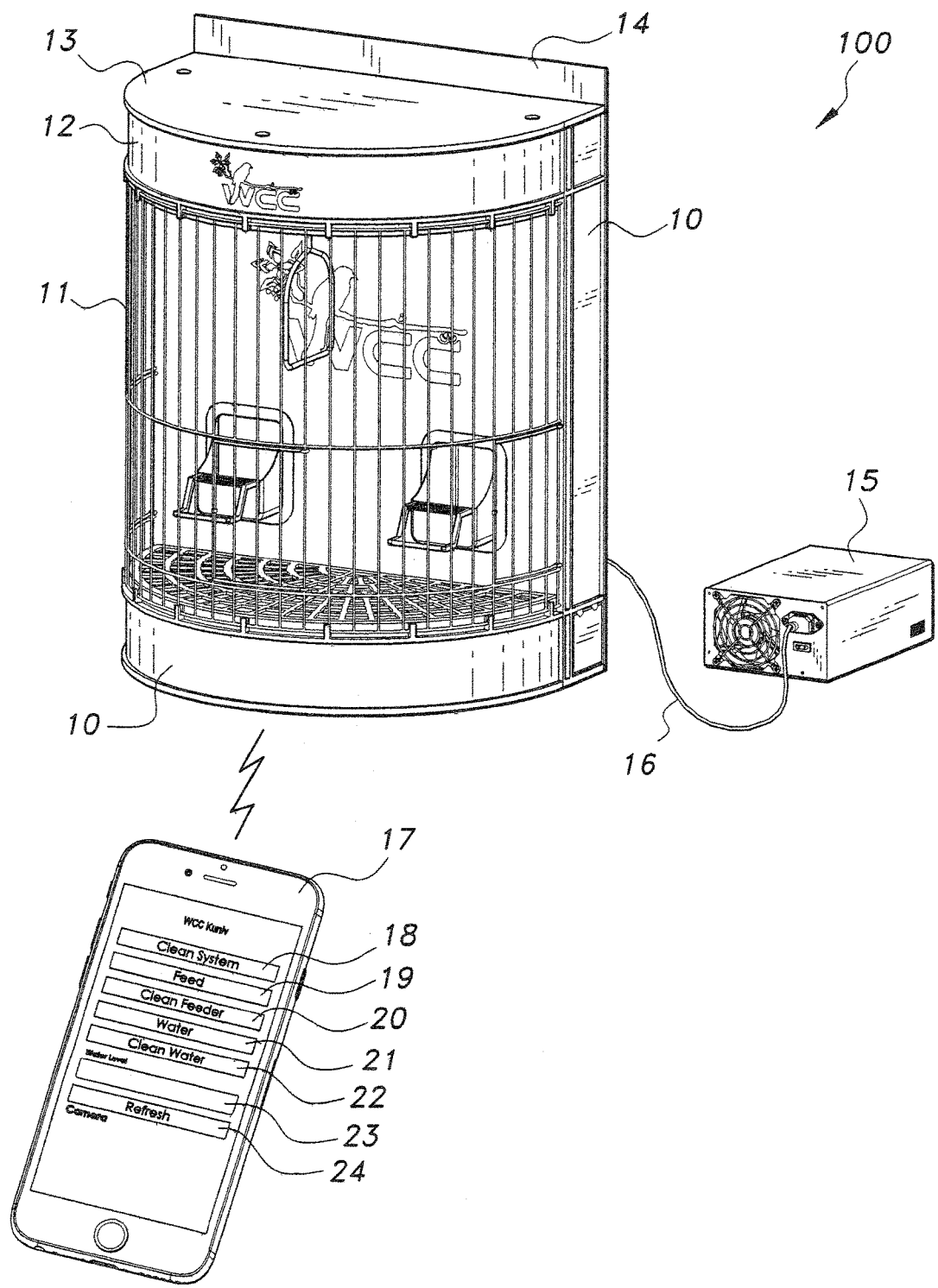
FIG. 1 is a perspective view of the system and control hardware, according to the present invention.

The automatic bird cage 100, as seen in FIG. 1, includes a power supply unit 15 connected to a cable 16 for supplying power to electronic and electromechanical components housed in the cage 10. The cage 10 has a front-facing rectangular planar back 14 and a front that extends in an arcuate, semi-circular manner from the front-facing planar back 14 of the cage 10. A top portion 12 of the semi-circular extending structure is capped by a ceiling 13 that conforms to the shape of the top portion 12. A wire mesh 11 is attached to a peripheral edge of the bird cage's front portion to form a boundary separating interior of the bird cage from the outside world. The wire mesh 11 may include doors that provide a user access to the interior of the cage 10. The electromechanical and electronic components housed in the cage 10 may be wirelessly controlled via a mobile wireless device 17 by activating a software application (app) that includes a "Clean System" button 18, a "Feed" button 19, a "Clean Feeder" button 20, a "Water" button 21, a "Clean Water" button 22, a "Water Level" indicator 23, and a "Refresh Button" 24.

Figure 2:
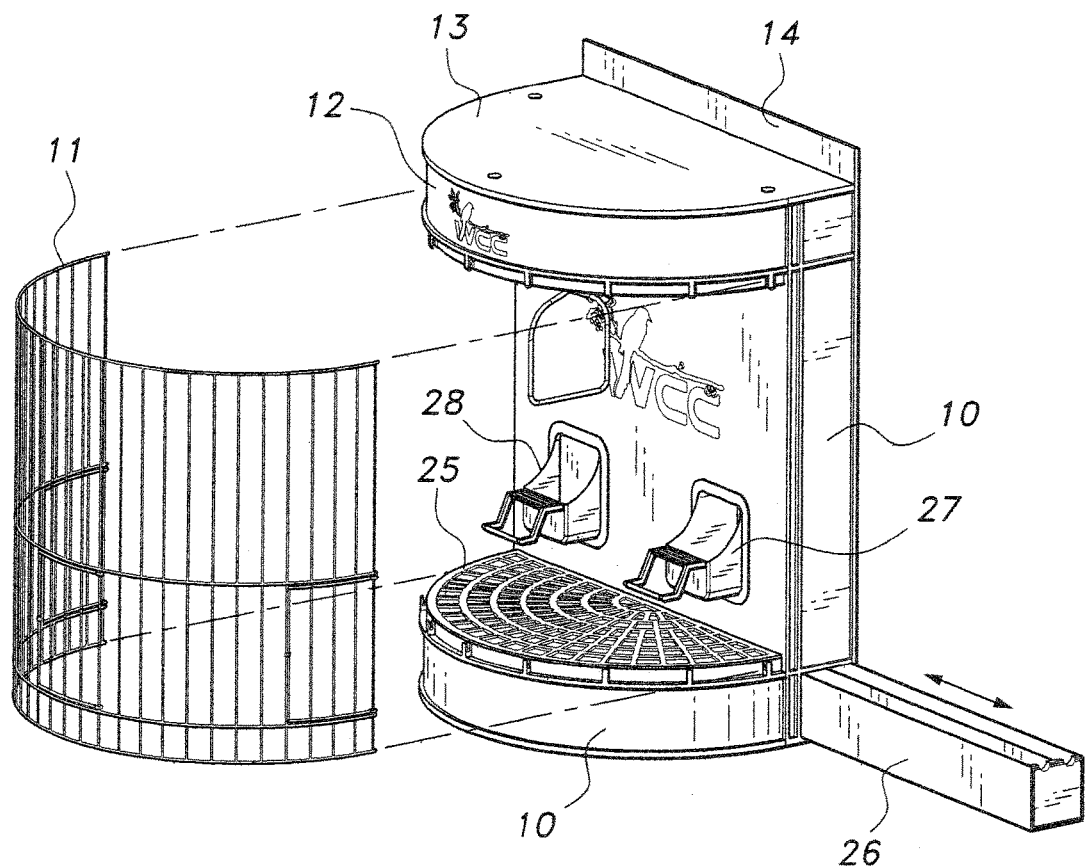
FIG. 2 is an exploded, perspective view of the birdcage, according to the present invention.
Figure 3:
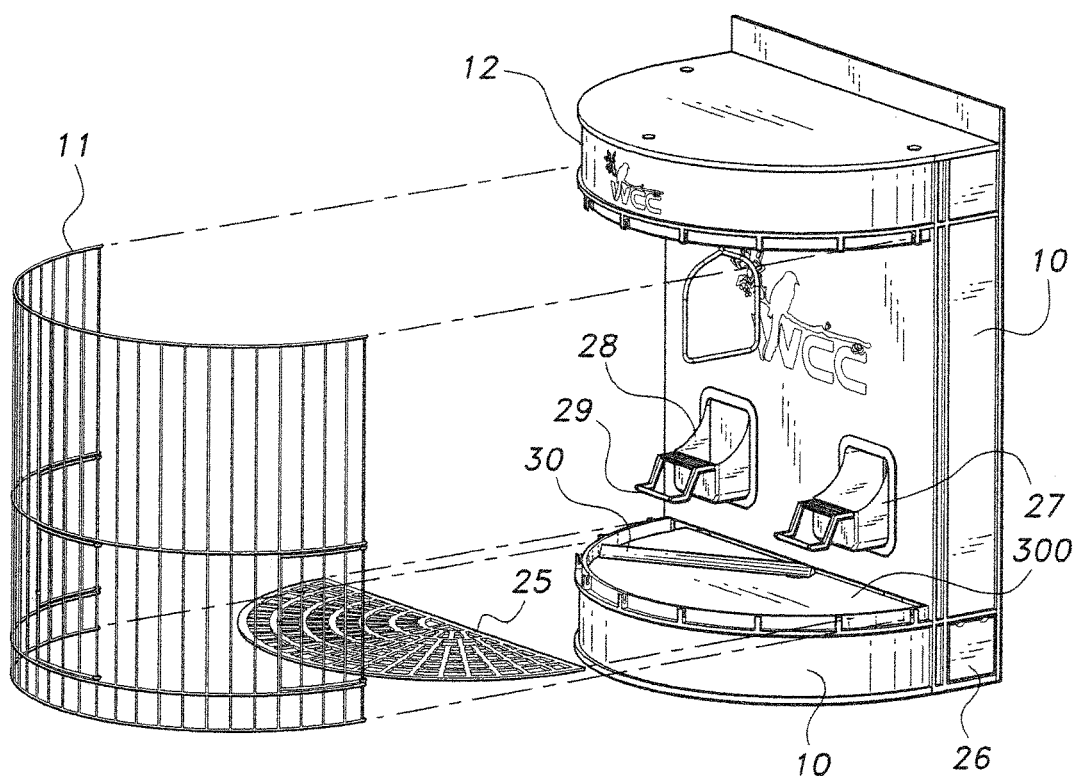
FIG. 3 is an exploded, perspective view of the birdcage illustrating a separate floor portion, according to the present invention.
Figure 4:
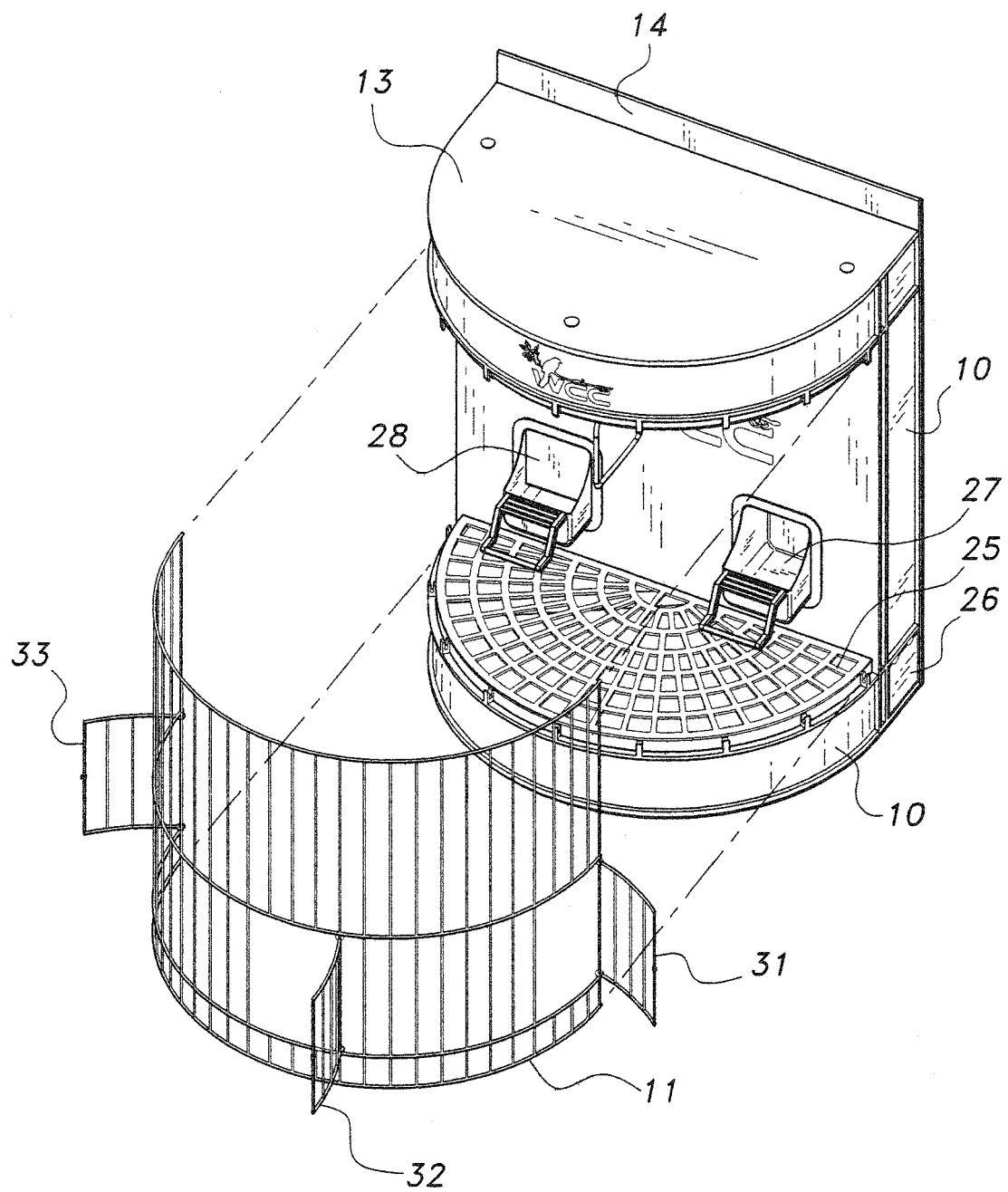
FIG. 4 is an exploded, perspective view of the birdcage illustrating the cage swinging doors, according to the present invention.
Figure 5:
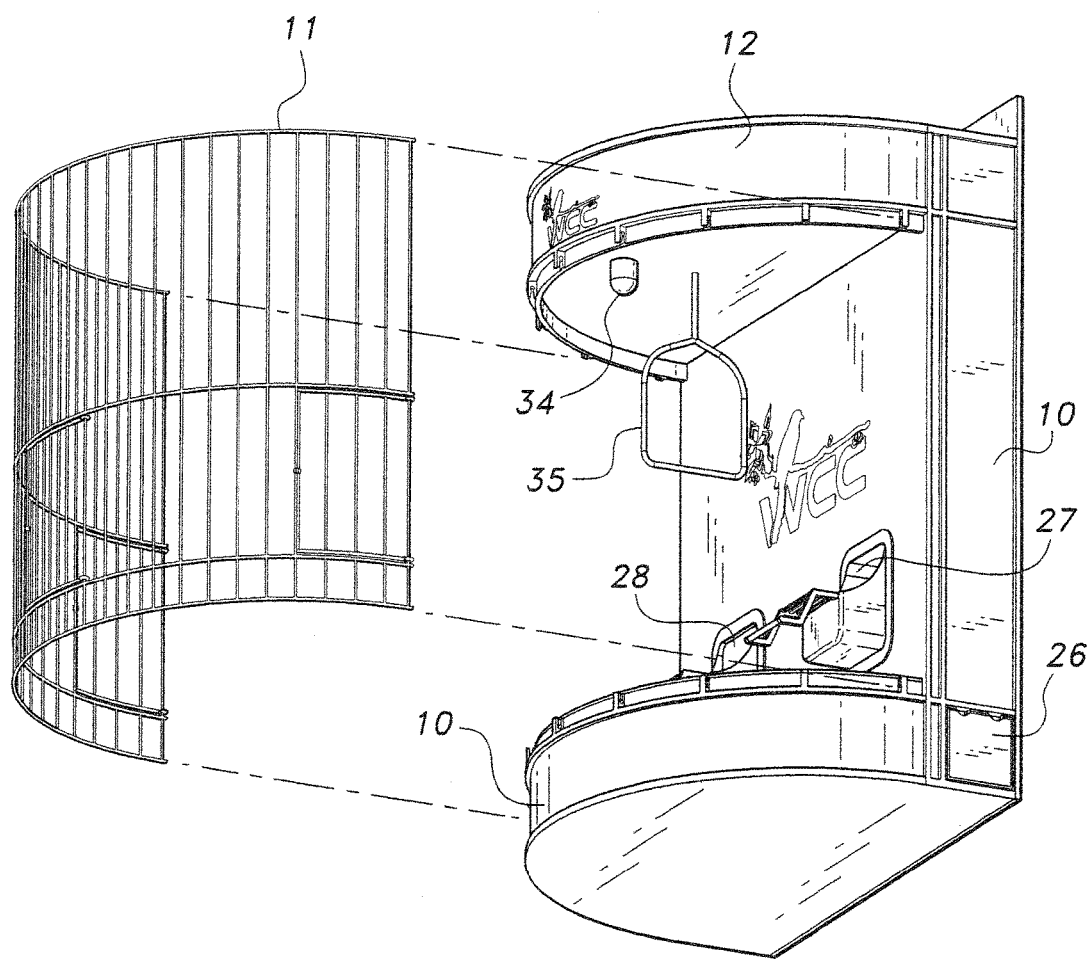
FIG. 5 is an exploded, perspective view of the birdcage illustrating a camera positioned in the birdcage, according to the present invention.
Figure 6:
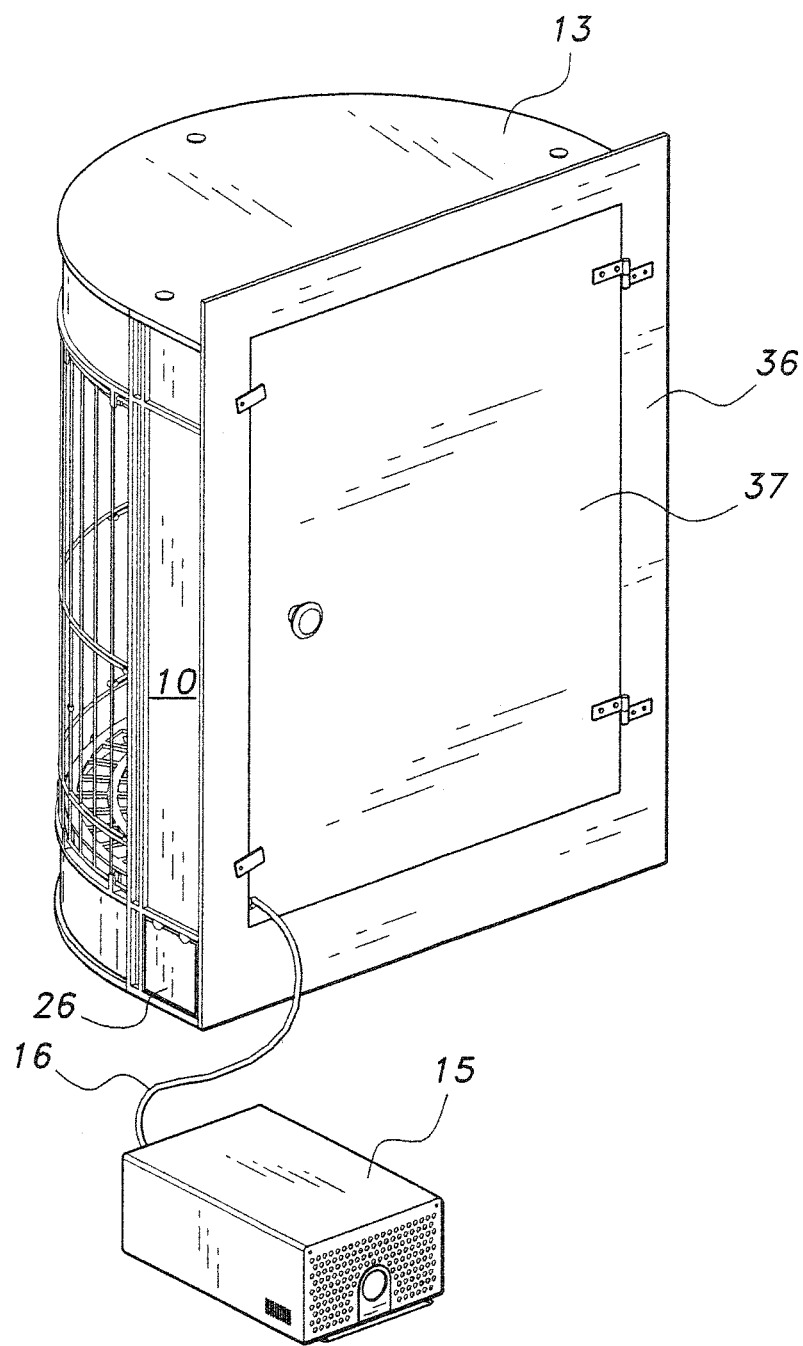
FIG. 6 is a rear, perspective view of the birdcage illustrating a power supply, according to the present invention.
Figure 7:
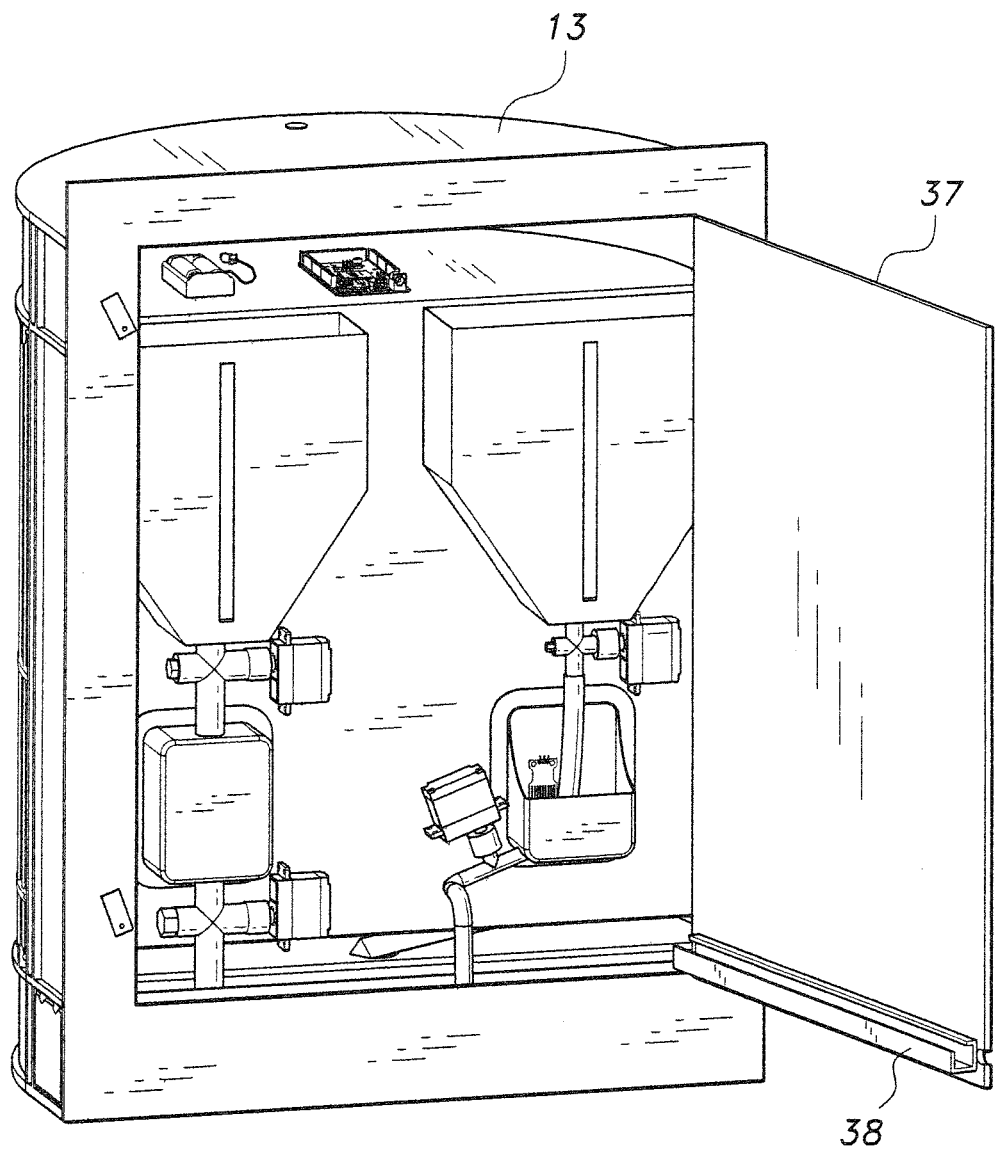
FIG. 7 is a rear, perspective view of the birdcage illustrating a components compartment door, according to the present invention.

As illustrated in FIG. 2, the interior back portion of the cage 10 includes a food bowl 27 and a water bowl 28. The semi-circular, arcuate bottom portion of the cage includes a removable floor net 25 which functions as a walking surface for a bird inside the cage structure 10, yet latticework of the net allows for waste to fall through the floor net 25. As illustrated in FIG. 3, when the floor net 25 is removed, a bottom floor 300 is exposed. A perch 29 may be provided or attached to the food bowl 27 and/or the water bowl 28. A floor cleaning wiper blade 30 is in pivotal contact with the bottom floor 300. As shown in FIGS. 2 and 3, a waste removal tray 26 has a rectangular cross-section and is slidably insertable into a slot disposed on the bottom side of the rear portion of cage structure 10. With respect to the embodiment shown in FIG. 4, a right side door 31, center door 32, and left side door 33 are pivotally attached to the wire mesh 11. As shown in FIG. 5, a camera 34 and a bird swing 35 are attached to an interior portion of the semi-circular, arcuate top portion of the cage. As shown in FIG. 6, a compartment door 37 is pivotally disposed on a rear facing planar frame 36 of the cage structure 10. The compartment door 37 covers a compartment that houses electronic and electromechanical components disposed in the cage structure 10. In FIG. 7, the compartment door 37 is shown in an open position, exposing the electronic and electromechanical components. A U shaped channel 38 extends along a bottom portion of the compartment door 37. The U shaped channel 38 functions as a holder for wires fed to the electronic and electromechanical components in the compartment.

Figure 8:
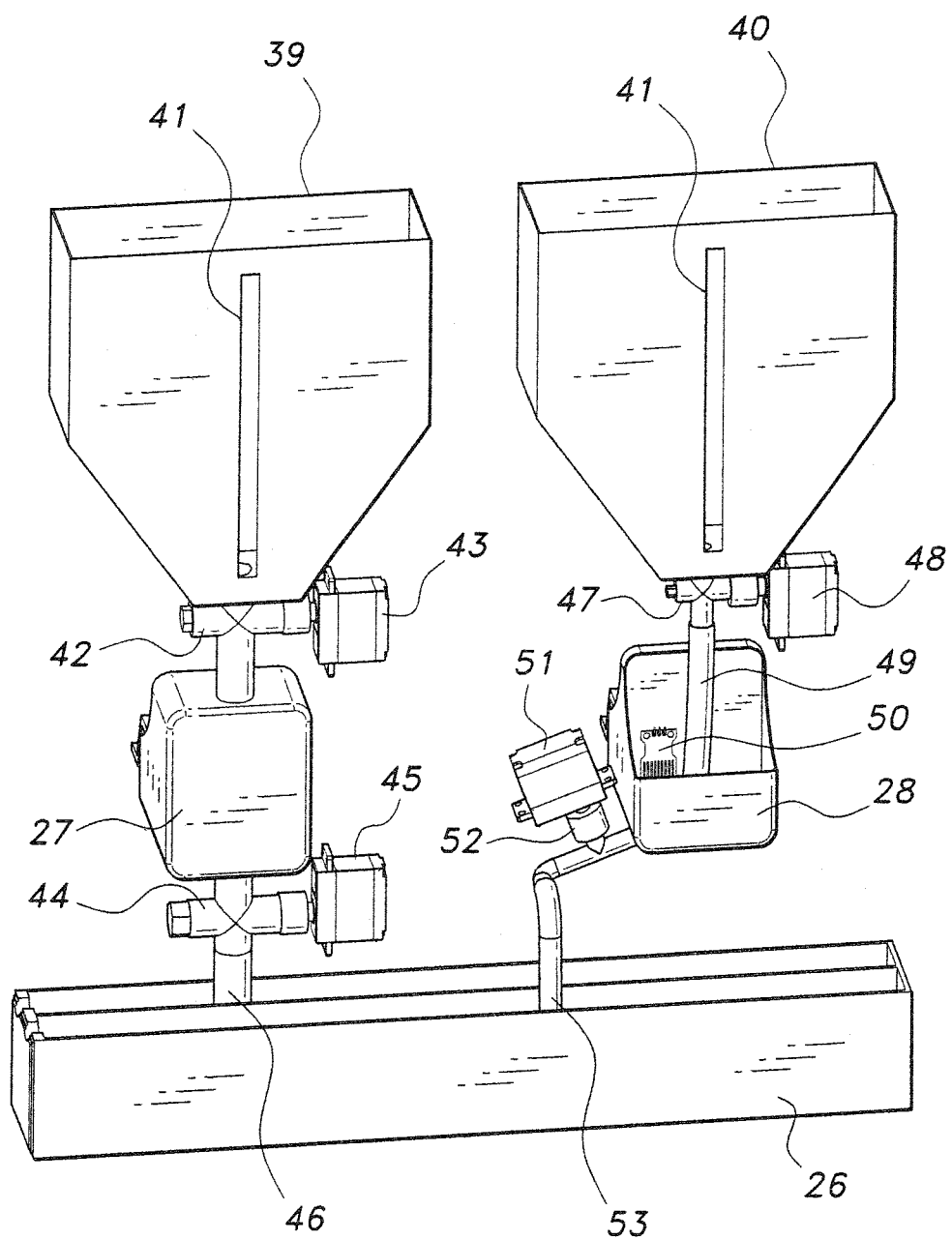
FIG. 8 is a perspective view of a birdcage feeder mechanism, according to the present invention, according to the present invention.
Figure 9:
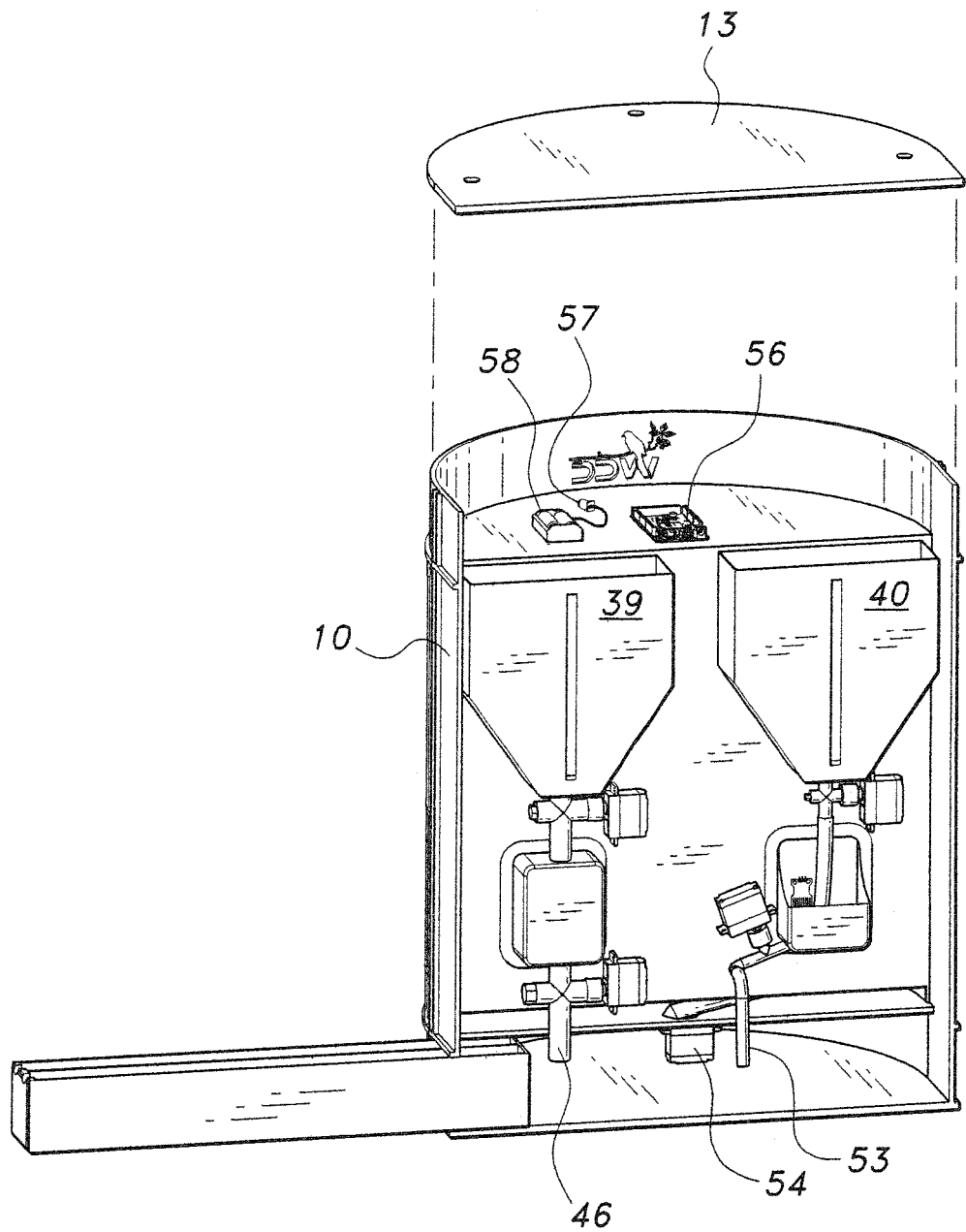
FIG. 9 is a perspective view of the birdcage showing waste food and water pipes, according to the present invention.

FIGS. 8 and 9 illustrate additional details of the electronic and electromechanical components. A tapered food storage container 39 and a tapered water storage container 40 are disposed in the compartment of cage structure 10. The tapered ends of the containers 39 and 40 extend in a downward direction and terminate at electronic valves for dispensing the food and water to the bowls 27 and 28 illustrated in FIGS. 2 and 3. As illustrated in FIG. 8, the tapered end of food storage container 39 attaches to food delivery pipe connector 42, the food delivery being controlled by servo motor 43 which is attached to the food delivery pipe connector 42 to control delivery of food to the food bowl 27. A waste food pipe 46 extends from bottom portion of food bowl 27 to a waste food trough of the waste removal tray 26. Flow of waste food through waste food pipe 46 is controlled by an attached waste food pipe connector 44 which is regulated by servo motor 45 attached to the waste food pipe connector 44.

Figure 10:
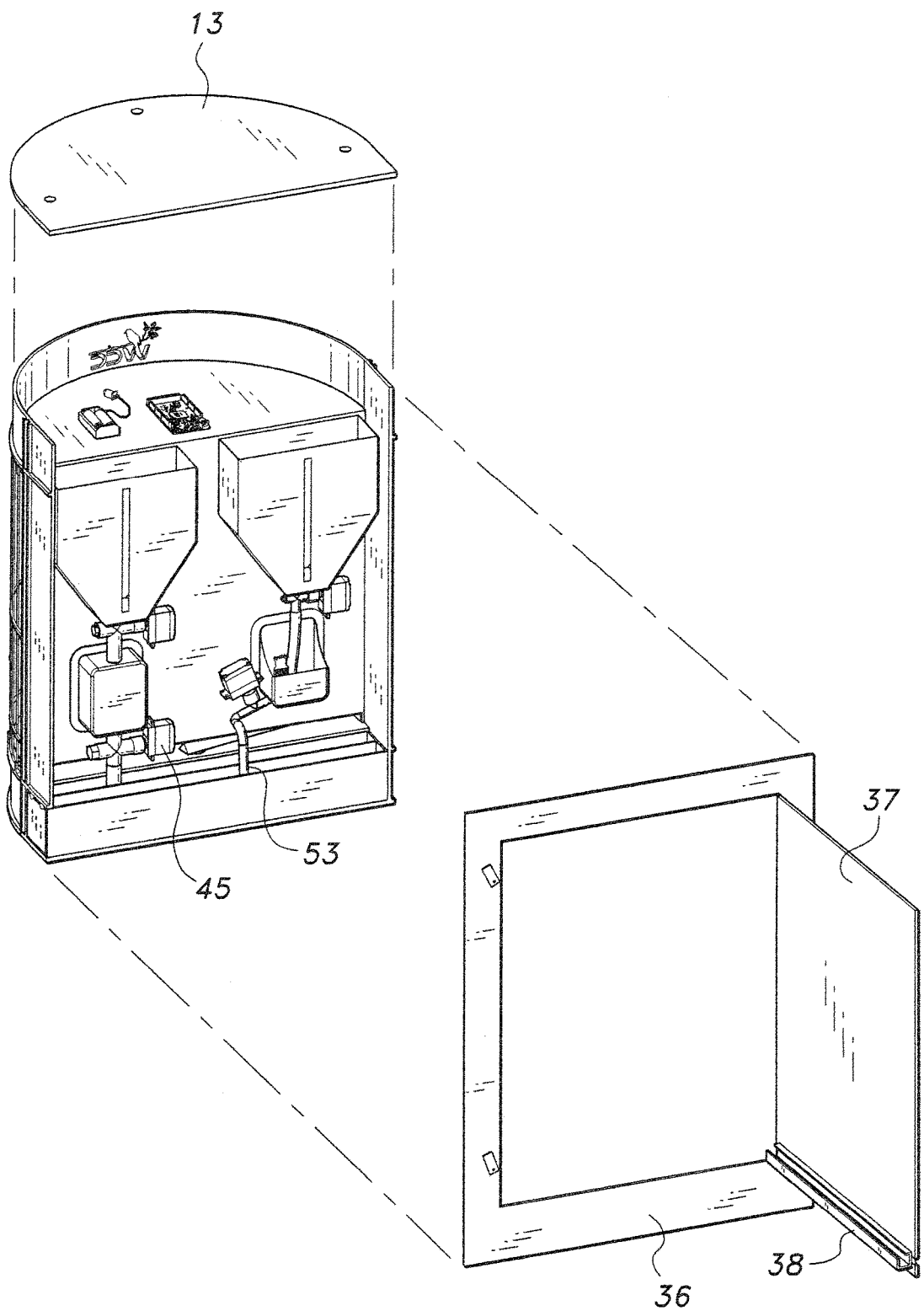
FIG. 10 is an exploded perspective view of the birdcage, attached feeder mechanism, and compartment cover, according to the present invention.

Similarly, the tapered end of water storage container 40 attaches to a water valve 47 which is attached to water pipe 49. Operation of the water valve 47 is controlled by attached servo motor 48, which controls the water delivery to the water bowl 28. Disposed inside the water bowl 28 is a water level sensor 50. A water drain pipe 53 extends from a bottom portion of water bowl 28 to a waste water trough of the waste removal tray 26. Flow of waste water through drain pipe 53 is controlled by a water neck outlet 52 which is regulated by servo motor 51 attached to the water neck outlet 52. As illustrated in FIG. 9, the control unit, processor 56, light switch 57 and light batteries 58 are disposed in an upper compartment formed by the arcuate portion of the cage structure 10. The ceiling 13 removably covers this upper compartment. Also, a servo motor 54 is disposed beneath the floor portion of the cage structure 10. Servo motor 54 is attached to the wiper blade 30 (shown in FIG. 3). FIG. 10 shows the compartment door 37 attached to rear facing frame 36. As illustrated, the compartment door 37 is in an open position showing the wire holding U shaped channel 38.

Figure 11:
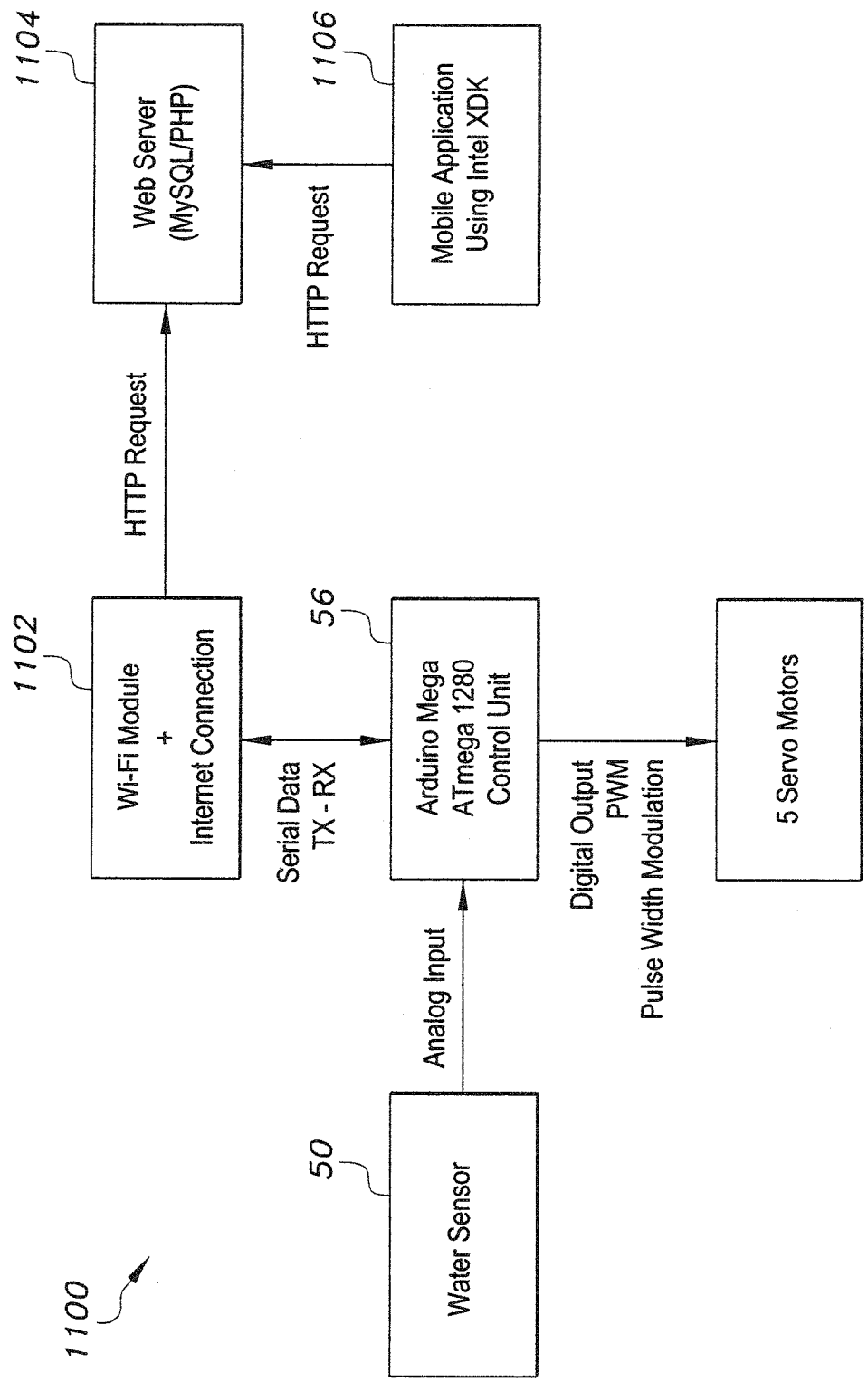
FIG. 11 is a system block diagram showing the component interconnects, according to the present invention.

As shown in FIG. 11, the processor used may be an Atmel® ATmega 1280 microcontroller 56, or a similar microcontroller. The processor 56 may be disposed on an Arduino MEGA printed circuit board. The Atmel® ATmega 1280 microcontroller 56 is the main microcontroller that controls functionality of the automatic birdcage 100. The processor 56 accepts analog input from the water sensor 50. The processor 56 communicates bi-directionally with Wi-Fi module and Internet connection 1102 which issues HTTP requests to a web server 1104. Similarly, using a mobile application 1106, the user's mobile device issues HTTP requests to the web server 1104. By sending commands to the processor 56, a user can control the opening/closing of the feeding containers in the cage. The cage may be controlled wirelessly using an application that can be downloaded on Android® mobile devices, or the like. The water container 40 may include a water level sensor 50. The user can read the level of the water in the mobile application displayed on mobile device 17, and judging from the water level he'll know if the water container 40 is running low or not. A Wi-Fi module 1102 provides the wireless connection between the user and the cage, and through the mobile application running on device 17, the user is able to control the opening/closing of both the food storage container 39 and water container 40, as well as monitor the bird through camera 34 which in some embodiments may be an IP video camera. Through operation of the IP camera 34, the user may monitor the food level of food container 39 so that when the food container 39 runs low, the user can send the command via mobile device 17 to refill the food container 39.

The system 100 is designed to dispose of previously provided food/water before providing new food or water. Thus, 4 servo motors are used in this process, A first servo motor 43 serves new food, and a second servo motor 45 disposes of the old food. Similarly, a third servo motor 48 serves fresh water, and a fourth servo motor 51 disposes of the old water.

The cage floor 300 is configured be cleaned frequently. A floor wiper 30 pivotally disposed on the cage floor 300 collects the dirt in compartments placed at the bottom sides of the cage. The fifth servo motor 54 actuates movement of the floor wiper 30 causing the floor wiper 30 to sweep at an angle of 180° (similar in action to a vehicle's windshield wiper).

Figure 13:
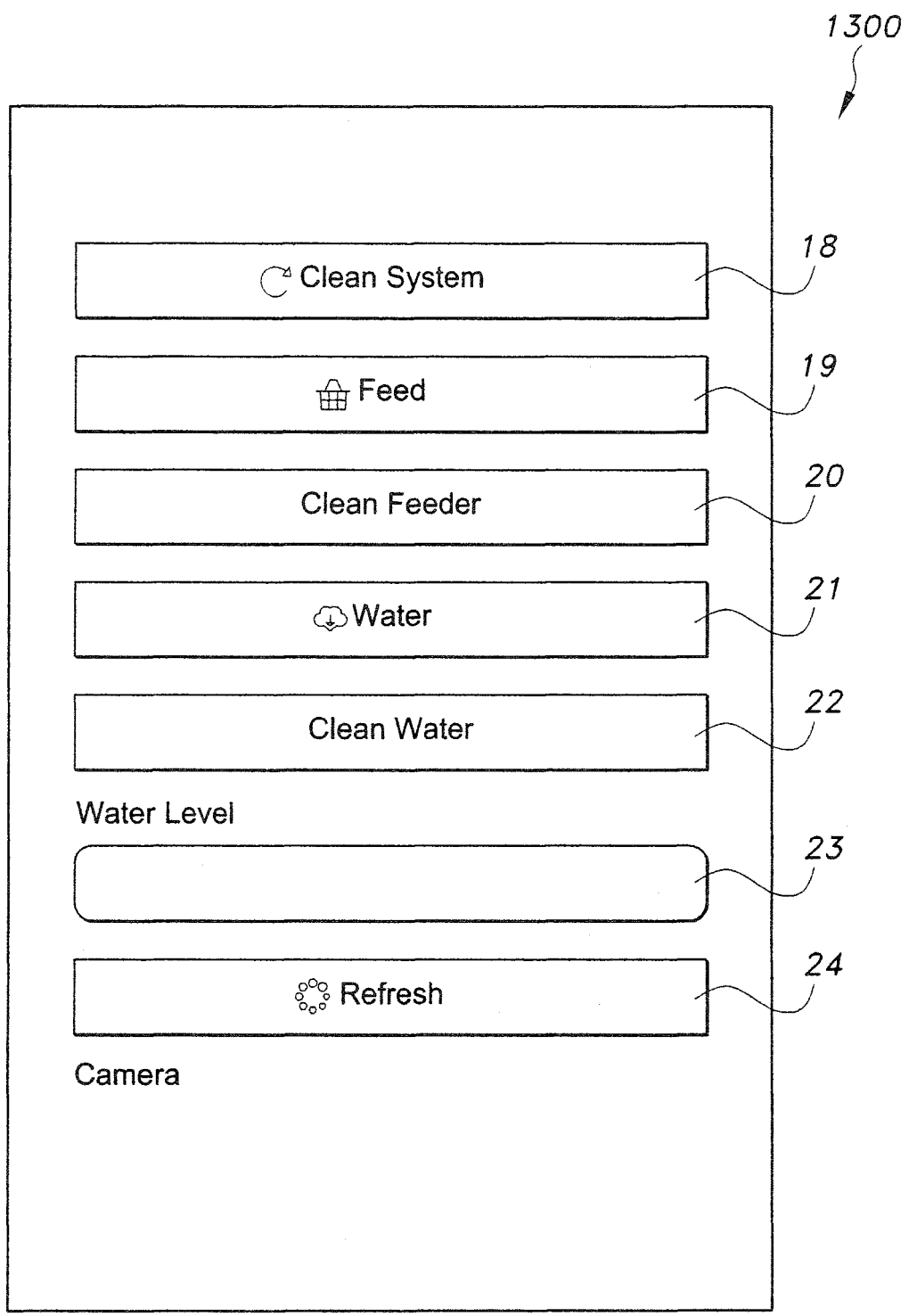
FIG. 13 is a screenshot illustrating the birdcage application running on a mobile device, according to the present invention.

When the user starts the mobile application running on mobile device 17, the page 1300 will appear, as shown in FIGS. 1 and 13. The application page includes 6 buttons with a description for each of them, plus a hyperlink at the bottom of the application page. The buttons include a "Clean System" button 18, a "Feed" button 19, a "Clean Feeder" button 20, a "Water" button 21, a "Clean Water" button 22, a "Water Level" indicator 23, and a "Refresh Button" 24. Engaging the "Clean System" button 18 activates the floor wiper 30 of the cage floor 300. A single sweeping action is performed thus cleaning the floor once. If "Feed" is engaged, it will fill the food container. If "Clean Feeder" is engaged it will dispose of the waste food. If "Water" is engaged, it will fill the water container. Finally if "Clean Water" is engaged, it will dispose of waste water. Including the six buttons on the application page, there can be a hyperlink in the mobile application. If the hyperlink "Camera" is activated it will start the streaming of the video camera placed on the cage to monitor the bird's behavior as well as to check if the food in the container is sufficient.

The water level sensor 50 may continuously check the level of water in the water container 40. If the user clicks on the "Refresh" button, it will display the level of water in degrees and judging from that information the user may determine if the water container needs to be refilled or not. With every click on "Refresh" the water level will be updated.

Figure 12:
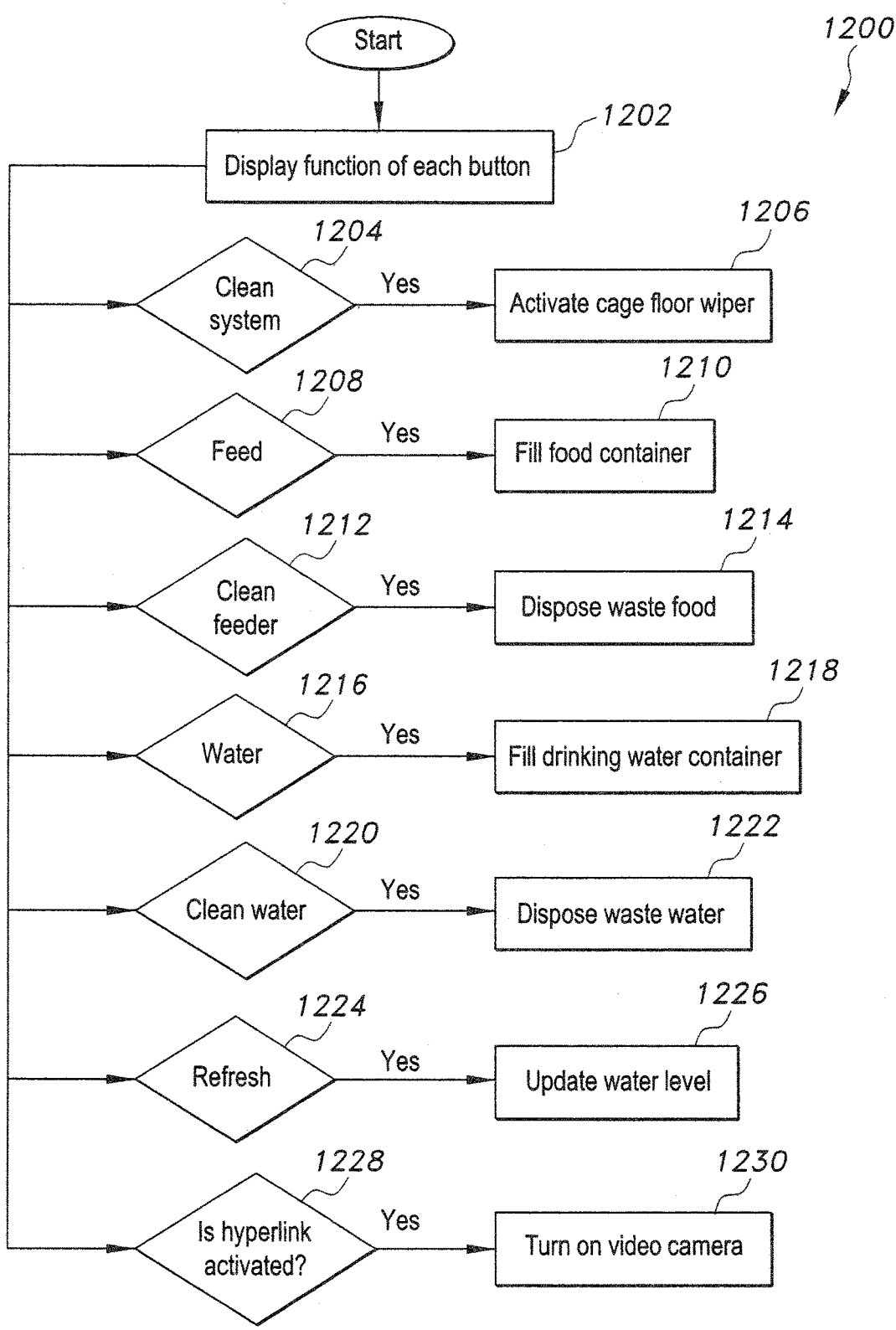
FIG. 12 is a flowchart illustrating the processing of the birdcage mechanism, according to the present invention.

FIG. 12 is the flow chart illustrating processing logic 1200 of the system 100. At step 1202 the function of each of the aforementioned buttons is displayed. At step 1204 a clean system button press causes activation of the cage floor wiper at step 1206. At step 1208 a Feed button press causes the food container to be filled at step 1210. At step 1212 a Clean feeder button press causes disposal of waste food at step 1214. At step 1216 a Water button press causes the drinking water container to be filled at step 1218. At step 1220 a Clean water button press causes waste water to be disposed of at step 1222. At step 1224 a Refresh button press causes the water level to be updated at step 1226. At step 1228 a click on the video hyperlink causes a video camera 1230 trained on the birdcage system 100 to record activity in and around the birdcage.

The present automatic bird cage system 100 includes a wireless connection between a user's mobile device and the birdcage electromechanical feeding mechanism to provide means for feeding the bird wirelessly, serving either water or food depending on the choice of the user. The present automatic bird cage system 100 includes a wireless receiver operable with a processor which is connected to the electromechanical mechanisms of the bird cage to provide means for receiving signals commanding the opening or closing of the feeding inlets through a mobile application, anytime and anywhere. The present automatic bird cage system 100 includes means for sending the camera footage to the user through the mobile application. The present automatic bird cage system 100 includes means for cleaning the floor of the cage for hygienic reasons. The present automatic bird cage system 100 includes means for providing a comfortable and friendly environment for the bird. The present automatic bird cage system 100 can be placed anywhere in the house hanging or placed on a table.

The cage 10 is made of strong plastic. As shown in FIG. 3, food bowl 27 is disposed opposite water bowl 28 on the interior back portion of the bird cage. Wiper 30 is disposed on the cage's floor 300. A storage compartment is disposed on a rear portion of the bird cage houses the automatic control circuit boards. Storage compartment door 37 covers the storage compartment to protect the automatic control circuit boards, food and water dispensers. Furthermore, waste drawer 26 is disposed hidden underneath cage floor 300 and is used to get rid of the dirt and leftovers swept for disposal by floor wiper 30.

When the "Clean System" button 18 is pressed, the processor 56 is commanded to control motor 54 which is connected to the wiper 30 causing a wiping action across the floor 300 to keep the cage floor 300 clean. When the "Feed" button 19 is engaged, the processor 56 is commanded to control motor 43 attached to food delivery pipe connector 42 and operable to fill the food bowl 27. The motor actuation is programmed for a rotation which allows the food to drop from the food container 39 to the bird's plate 27, and a counter-rotation which stops the food from dropping. The time delay for each operation is approximately two seconds.

When the "Clean feeder" button is engaged, the processor 56 is commanded to control motor 45 disposed below and operable with the food bowl 27, causing the leftover of the seeds from the food bowl 27 to be ejected into a waste removal tray 26 at the bottom of the cage. When the "Water" button is engaged, the processor 56 is commanded to control motor 48 attached to the water container 40 which causes the water to flow to the water bowl 28 to provide the caged bird with access to water.

When the "Clean water" button is engaged, the processor 56 is commanded to control motor 51 attached to drain pipe 53 which causes the dirty water from the water bowl 28 to be ejected into the waste removal tray 26 placed at the bottom of the cage.

The processor 56 is operable with water level sensor 50 and updates a water level indicator on the application page to show the level that the water has reached and give an indication to the user of the water amount left in the water bowl 28. The maximum range for the water level sensor is 1024 units. The "Refresh" button commands the processor 56 to update a new water level, keeping the user updated with the level of the water.

The processor 56 is in operable communication with web server 1104 and may serve up a variety of application pages, including a video recording page. When the Camera button is engaged, the processor 56 is commanded to directly access an Internet Protocol (IP) address of the camera to display on a page served by web server 1104 a live recording that monitors the bird's actions and to check the level of the food container.

With respect to operation of the present automatic bird cage system, when a command is given by engaging one of the buttons on the app, the signal is transmitted to the processor 56, for example, an Arduino ATmega 1280, that is connected to Wi-Fi module and Internet connection 1102, e.g., an Arduino Wi-Fi shield, and will operate depending on the button that has been used. The process where the signal is transmitted from the application and received by the processor 56 has a slight time delay ranging from 5 seconds up to 1 minute and it all depends on the speed of the internet connection. If the user is in the country it takes from 5 seconds to 30 seconds, but if the user is abroad it will take a minute.

The motors used in the system have a time delay between 10 seconds up to one minute in order for it to receive the pulse width modulation (PWM) signal from the processor 56 and thus operate. The exemplary Arduino Mega was used instead of Arduino UNO because it has multiple outputs. This will reduce the number of Arduino UNO that will be used along with the Wi-Fi shield. As such, instead of using a single Arduino UNO for each motor, one Arduino Mega and a Wi-Fi shield may be used. The output of each motor is connected to the Arduino Mega and the output of the Arduino Mega is connected to the power supply 15. Power supply 15 was used because the circuit has different voltages. The first voltage is equal to 9V and it is the maximum voltage used for the Arduino Mega. The other voltage is connected to the motors of the circuit and it is equal to 5V. Therefore, a converter (that coverts an ATX supply to a bench supply) connected to the power supply is the only one that can operate a circuit with different voltages for each component. The converter has a replaceable 5A fuse, so that when one of the motors stalls it will immediately stop before it consumes high current and therefore prevent any damage to the motors. There are two wires coming out from the converter. One is connected to the Arduino Mega, and the second one is connected to the motors. For the wires connected to the motors, a red cable of the converter is connected to a red cable of the motor, and a black cable of the converter connected to a black cable of the motor. After programming the code and downloading it on the Arduino Mega, the circuit will operate according to the user's input from the application page 1300.

The floor wiper 30 may operate automatically or manually. It may operate automatically every two to three minutes to clean the cage or it may operate when the "Clean" system button is engaged by the user.

In order for the cage to look more beautiful and attractive, the containers on each side were hidden in a storage cabin in the back of the cage. Inside this cabin, the entire electrical circuit will be placed along with the servo motors and the trash can.

The floor of the cage has beautiful decorations of small flowers with small spaces so that the bird's legs won't be stuck in it.

Water level sensor 50 is placed inside the water container so that it measures the water level in degrees and it'll be shown in the mobile app. Since there is no sensor to measure the low level of the food, the IP camera is added on the top of the cage to check if the food is sufficient and also the bird's condition.

Everything in the cage may be controlled wirelessly through the application for Android® or a like mobile client, that allows the user to clean the cage, dispose the dirty water and food, add the water and food to the bird's plate, and monitor the bird's condition. The application code is shown in Table 1.

TABLE 1

Computer Wireless Controlling Cage code

```
#include <SPI.h>
#include <WiFi.h>
#include <Servo.h>
#define pinServo1 3
```

TABLE 1-continued

Computer Wireless Controlling Cage code

```
#define pinServo2 5
#define pinServo3 6
#define pinServo4 7
#define pinServo5 9
#define DELAY_INITIAL 500
#define DELAY_POSITION 1000
#define DLEAY_CLEAN 30 // DLEAY_CLEAN =
DLEAY_CLEAN * DELAY_SYSTEM // DELAY_SYSTEM =
500 and DLEAY_CLEAN = 60 then 500*60 = 30000ms then
30sec
#define DLEAY_CLEAN_BETWEEN 15
#define DELAY_SYSTEM 1000
Servo servo1;
Servo servo2;
Servo servo3;
Servo servo4;
Servo servo5;
char ssid[ ] = "VIVA-Router-4G-LTE";     // your network SSID
(name)
char pass[ ] = "VIVAadmin"; // your network password
int status = WL_IDLE_STATUS;    // the Wifi radio's status
char server[ ] = "www.wwckuniv.com";
WiFiClient client;
char recivedData;
String temp = " ";
String water=0;
int countToClean = 0;
char actions = ' ';
void setup( ){
   Serial.begin(9600);
   initialWifi( );
   delay(3000);
servo1.attach(pinServo1);
   servo2.attach(pinServo2);
   servo3.attach(pinServo3);
   servo4.attach(pinServo4);
   servo5.attach(pinServo5);
   initialization( );
   clean( );
}
void loop( ){
   getAction( );
   activateAction( );
   readData( );
   updateInfo(water);
   if(countToClean > DLEAY_CLEAN){
      clean( );
      countToClean = 0;
   } countToClean = countToClean + 1;
   delay(500);
}
void activateAction( ){
   switch(actions){
      case '1':
         clean( );
         break;
      case '2':
         feed( );
         break;
      case '3':
         feedClean( );
         break;
      case '4':
         waterFlow( );
         break;
      case '5':
         waterClean( );
         break;
   }
   resetAction( );
   delay(1000);
}
void initialWifi( ){
//Serial.begin(9600);
if (WiFi.status( ) == WL_NO_SHIELD) {
   Serial.println("WiFi shield not present");
   // don't continue:
   while(true);
}
// attempt to connect to Wifi network:
while ( status != WL_CONNECTED) {
   Serial.print("Attempting to connect to SSID: ");
   Serial.println(ssid);
   // Connect to WPA/WPA2 network. Change this line if using
open or WEP network:
   status = WiFi.begin(ssid, pass);
   // wait 10 seconds for connection:
   delay(10000);
}
Serial.println("Connected to wifi");
printWifiStatus( );
Serial.println("\nStarting connection to server...");
// if you get a connection, report back via serial:
if (client.connect(server, 80)) {
   Serial.println("connected to server");
   // Make a HTTP request:
   client.println("GET
http://www.wwckuniv.com/getAction.php?id=1");
   client.println("Host:wwckuniv.com");
   client.println("Connection: close");
   client.println( );
}
}
void printWifiStatus( ) {
   // print the SSID of the network you're attached to:
   Serial.print("SSID: ");
   Serial.println(WiFi.SSID( ));
   // print your WiFi shield's IP address:
   IPAddress ip = WiFi.localIP( );
   Serial.print("IP Address: ");
   Serial.println(ip);
   // print the received signal strength:
   long rssi = WiFi.RSSI( );
   Serial.print("signal strength (RSSI):");
   Serial.print(rssi);
   Serial.println(" dBm");
}
void updateInfo(String water){
   if (client.connect(server, 80) {
      Serial.println("Trying to request");
      // Make a HTTP request:
      client.println("GET
http://www.wwckuniv.com/setWater.php?id=1&water="+water);
      client.println("Host:wwckuniv.com");
      client.println("Connection: close");
      client.println( );
      Serial.println("Request Success");
      while (client.available( )) {
         char c = client.read( );
         Serial.write(c);
      }
      // if the server's disconnected, stop the client:
      if (!client.connected( )) {
         Serial.println( );
         Serial.println("disconnecting from server.");
         client.stop( );
      }
   }
}
void resetAction( ){
   if (client.connect(server, 80)) {
      Serial.println("Trying to request");
      // Make a HTTP request:
      client.println("GET
http://www.wwckuniv.com/setAction.php?id=1&action=7");
      client.println("Host:wwckuniv.com");
      client.println("Connection: close");
      client.println( );
      Serial.println("Request Success");
      while (client.available( )) {
         char c = client.read( );
         Serial.write(c);
      }
      // if the server's disconnected, stop the client:
      if (!client.connected( )) {
         Serial.println( );
```

TABLE 1-continued

Computer Wireless Controlling Cage code

```
            Serial.println("disconnecting from server.");
            client.stop( );
        }
    }
}
void readData( ){
    int waterLevel = analogRead(A0);
    water = String(waterLevel);
    Serial.print("Water Level:");
    Serial.println(waterLevel);
}
void initialization( ) {
    servo1.write(0);
    delay(DELAY_INITIAL);
    servo2.write(0);
    delay(DELAY_INITIAL);
    servo3.write(0);
    delay(DELAY_INITIAL);
    servo4.write(90);
    delay(DELAY_INITIAL);
    servo5.write(90);
    delay(DELAY_INITIAL);
}
void setPosition( ) {
    servo1.write(10);
    servo2.write(10);
    servo3.write(10);
    servo4.write(10);
    servo5.write(10);
}
void clean( ){
    int i;
    for(i=10;i<170;i++){
        servo2.write(i);
        delay(DLEAY_CLEAN_BETWEEN);
    }
    for(i=170;i>10;i--){
        servo2.write(i);
        delay(DLEAY_CLEAN_BETWEEN);
    }
}
void waterFlow( ){
    servo5.write(170);
    delay(1500);
    servo5.write(90);
    delay(1500);
}
void waterClean( ){
    servo4.write(170);
    delay(1500);
    servo4.write(90);
    delay(1500);
}
void feed( ){
    servo3.write(90);
    delay(2000);
    servo3.write(0);
    delay(2000);
}
void feedClean( ){
    servo1.write(90);
    delay(2000);
    servo1.write(0);
    delay(2000);
}
void getAction( ){
    if (client.connect(server, 80)) {
        Serial.println("connected to server");
        // Make a HTTP request:
        client.println("GET
http://www.wwckuniv.com/getAction.php?id=1");
        client.println("Host:wwckuniv.com");
        client.println("Connection: close");
        client.println( );
    }
    if (client.connect(server, 80)) {
        Serial.println("Trying to request");
        // Make a HTTP request:
```

TABLE 1-continued

Computer Wireless Controlling Cage code

```
        client.println("GET
http://www.wwckuniv.com/getAction.php?id=1");
        client.println("Host:wwckuniv.com");
        client.println("Connection: close");
        client.println( );
    Serial.printin("Request Success");
    Serial.println("Get Action");
    delay(5000);
    while (client.available( )) {
        char c = client.read( );
        Serial.write(c);
        actions = c;
    }
    // if the server's disconnected, stop the client:
    if (!client.connected( )) {
        Serial.println( );
        Serial.println("disconnecting from server.");
        client.stop( );
    }
    }
}
```

It is to be understood that the present invention is not limited to the embodiments described above, but encompasses any and all embodiments within the scope of the following claims.

We claim:

1. An automatic bird cage, comprising:
a bird cage having an interior volume defined within a wire mesh, a floor, and a ceiling;
an electromechanical wiping mechanism disposed on the floor of the bird cage;
wherein the electromechanical wiping mechanism includes a wiper blade;
electromechanical food and water feeders disposed in the interior volume of the bird cage;
a food bowl connected to the electromechanical food feeder;
a water bowl connected to the electromechanical water feeder;
wireless means configured to actuate the electromechanical wiping mechanism to clean the floor of the bird cage and to actuate the electromechanical food and water feeders in order to dispense food to the food bowl and dispense water to the water bowl;
wherein the food and water are thereby accessible by a bird stationed in the bird cage; a waste removal tray slidably insertable into a bottom portion of the bird cage, the waste removal tray having a waste food trough and a waste water trough;
a food waste pipe extending from a bottom of the food bowl, the food waste pipe including a servo motor for regulating disposal of food waste through the food waste pipe to the waste food trough; and
a water waste pipe extending from a bottom of the water bowl, the water waste pipe including a servo motor for regulating disposal of water waste through the water waste pipe to the waste water trough.

2. The automatic bird cage according to claim 1, wherein the wireless means is further configured to actuate the electromechanical wiping mechanism, the electromechanical food feeder, and the electromechanical water feeder from a mobile wireless device.

3. The automatic bird cage according to claim 1, further comprising a floor net disposed above the floor, the floor net being comprised of a latticework allowing the bird to walk on the floor net while allowing waste to drop to the floor.

4. The automatic bird cage according to claim 1, further comprising a perch attached to and extending from the food bowl.

5. The automatic bird cage according to claim 1, further comprising a perch attached to and extending from the water bowl.

6. The automatic bird cage according to claim 1, further comprising a bird swing attached to and suspended from a top interior portion of the bird cage.

7. The automatic bird cage according to claim 1, wherein the wire mesh is attached to a peripheral edge of a front portion of the bird cage to form a boundary about the interior volume of the bird cage.

8. The automatic bird cage according to claim 7, wherein the wire mesh includes at least one access door allowing access to the interior volume.

9. The automatic bird cage according to claim 1, further comprising a camera attached to the ceiling within the interior volume of the bird cage.

10. The automatic bird cage according to claim 9, wherein the camera is a video camera trained on the interior volume of the bird cage to provide a video feed of the condition of the bird and the bird cage.

11. An automatic bird cage comprising:
   a bird cage having an interior, a floor and a ceiling;
   an electromechanical wiping mechanism disposed on the floor of the bird cage;
   wherein the electromechanical wiping mechanism includes a wiper blade;
   electromechanical food and water feeders disposed in the interior of the bird cage;
   a food bowl connected to the electromechanical food feeder;
   a water bowl connected to the electromechanical water feeder;
   first means for wirelessly actuating the electromechanical wiping mechanism to clean the floor of the bird cage; and
   second means for wirelessly actuating the electromechanical food and water feeders for dispensing food to the food bowl and dispensing water to the water bowl for food and water access by a bird stationed in the bird cage;
   a waste removal tray slidably insertable into a bottom portion of the bird cage, the waste removal tray having a waste food trough and a waste water trough;
   a food waste pipe extending from a bottom of the food bowl, the food waste pipe including a servo motor for regulating disposal of food waste through the food waste pipe to the waste food trough; and
   a water waste pipe extending from a bottom of the water bowl, the water waste pipe including a servo motor for regulating disposal of water waste through the water waste pipe to the waste water trough.

12. The automatic bird cage according to claim 11, wherein the waste removal tray includes a waste water trough and a waste food trough.

13. The automatic bird cage according to claim 12, further comprising:
   a first electrically controlled valve attached to the water waste pipe, the first electrically controlled valve selectively allowing water to drain from the water bowl into the waste water trough;
   a second electrically controlled valve attached to the food waste pipe, the second electrically controlled valve selectively allowing food to exit the food bowl into the waste food trough.

14. The automatic bird cage according to claim 13, further comprising:
   third means for wirelessly actuating the first electrically controlled valve; and
   fourth means for wirelessly actuating the second electrically controlled valve.

15. The automatic bird cage according to claim 14, wherein the third means for wirelessly actuating the first electrically controlled valve, and the fourth means for wirelessly actuating the second electrically controlled valve are actuated from a mobile wireless device.

16. The automatic bird cage according to claim 15, further comprising a water level sensor in operable communication with the water bowl.

17. The automatic bird cage according to claim 16, further comprising fifth means for wirelessly monitoring the water level in the water bowl from the mobile wireless device.

* * * * *